United States Patent [19]

Bratt et al.

[11] Patent Number: 4,618,925

[45] Date of Patent: Oct. 21, 1986

[54] DIGITAL DATA PROCESSING SYSTEM CAPABLE OF EXECUTING A PLURALITY OF INTERNAL LANGUAGE DIALECTS

[75] Inventors: Richard G. Bratt, Wayland; Ronald H. Gruner, Cary; Thomas M. Jones, Chapel Hill; James T. Nealon, Cary, all of N.C.

[73] Assignee: Data General Corporation, Westboro, Mass.

[21] Appl. No.: 630,991

[22] Filed: Jul. 13, 1984

Related U.S. Application Data

[63] Continuation of Ser. No. 266,418, May 22, 1981, abandoned.

[51] Int. Cl.[4] .............................................. G06F 9/16
[52] U.S. Cl. .................................................... 364/200
[58] Field of Search .............................. 364/200, 900

[56] References Cited

U.S. PATENT DOCUMENTS

| | | | |
|---|---|---|---|
| 3,753,236 | 8/1973 | Flynn et al. | 364/200 |
| 3,831,148 | 8/1974 | Greenwald et al. | 364/200 |
| 3,878,514 | 4/1975 | Faber | 364/200 |
| 4,041,461 | 8/1977 | Kratz et al. | 364/200 |
| 4,077,058 | 2/1978 | Appell et al. | 364/200 |
| 4,130,869 | 12/1978 | Kinoshita et al. | 364/200 |
| 4,205,370 | 5/1980 | Hirtle | 364/200 |
| 4,245,302 | 1/1981 | Amdahl | 364/200 |

Primary Examiner—Gareth D. Shaw
Assistant Examiner—Daniel K. Dorsey
Attorney, Agent, or Firm—Robert F. O'Connell

[57] ABSTRACT

The processor of the present invention can execute any of a plurality of dialects of "S-Language" instructions. S-Languages are of a higher order than typical machine languages but of a lower order than the user's own high order language. They can be tailored for compatibility with user high order languages. Each instruction of a particular S-Language is interpreted by a sequence of microinstructions. In the processor of the present invention, dispatching to the microinstruction sequencer is controlled jointly by the instruction bit pattern and the current contents of a dialect register. Each procedure to be executed carries with it information from which the appropriate contents of the dialect register may be determined. Thus, the processor of the present invention can always operate as an effective optimum processor for executing the procedure regardless of the source language chosen for writing that procedure.

6 Claims, 1 Drawing Figure

DIGITAL DATA PROCESSING SYSTEM CAPABLE OF EXECUTING A PLURALITY OF INTERNAL LANGUAGE DIALECTS

CROSS REFERENCE TO RELATED APPLICATIONS

The present patent application is related to other patent applications assigned to the assignee of the present application.

BACKGROUND OF THE INVENTION

1. Field of the Invention

The present invention relates to digital data processing system and, more particularly, to a multiprocess digital data processing system which is capable of executing a plurality of internal language dielects corresponding to a plurality of user languages.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positve identification of users requesting access to information, or of information, nor have such mechanisms been sufficiently flexible in operation. In addition, access rights have pertained to the users rather than to the information, so that control of access rights has been difficult. Finnally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A particular problem in prior art sytems with reference to the invention of concern herein relates to a data processing system's instruction structure which includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements which are particularly relevant to the use of a plurality of different user programs and to the execution of a plurality of internal language dielects corresponding thereto.

SUMMARY OF THE INVENTION

The present invention is useful in a data processing system which is designed for use in interconnected data processing networks, the internal structure of the system being flexible, protected from users, effectively invisible to users, and providing a flexible and simplified interface to users. The present invention of concern herein provides in such a data processing system an instruction structure wherein high level user language instructions are transformed into dialect coded, uniform, intermediate level instructions to provide equal facility of execution for a plurality of user languages.

It is thus advantageous to incorporate the present invention into a data processing sytem because the present invention provides a data processing system which is equally efficient with any user level language by providing a mechanism for referring to operands in user programs by uniform format names and instruction structure incorporating dialect coded, uniform format intermediate level instructions.

It is thus an object of the present invention to provide an improved data processing system.

It is another object of the present invention to provide a data processing system capable of use in large, interconnected data processing networks.

It is still another object of the present invention to provide a simplified and flexible user interface to a data processing system.

It is a still further object of the present invention to provide an instruction structure allowing efficient data processing system operation with a plurality of high level user languages.

Other objects, advantages and features of the present invention will be understood by those of ordinary skill in the art, after referring to the following detailed description of the preferred embodiments and drawings wherein:

Figure 1:
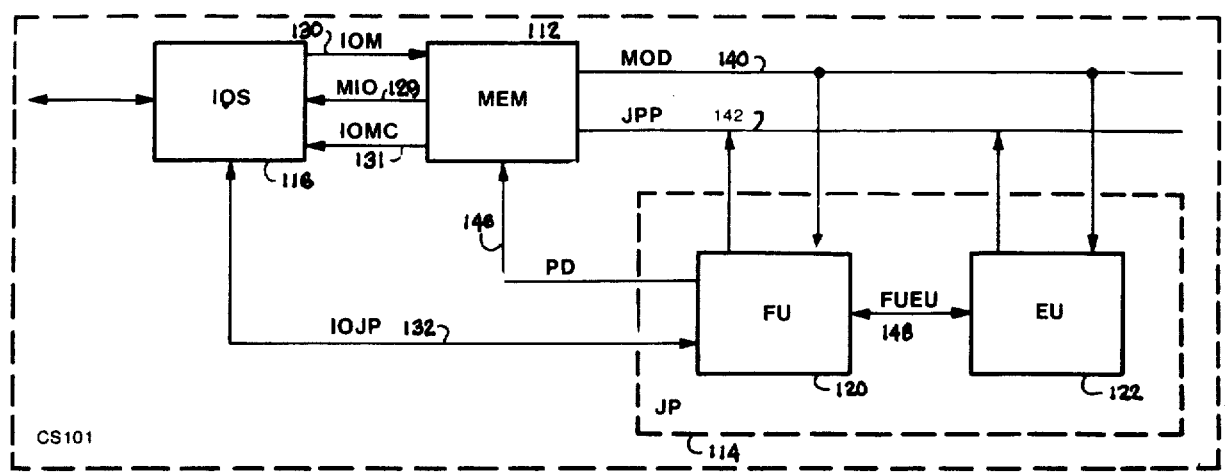
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,555,602, on June 19, 1984.

More particularly, attention is directed to FIGS. 110, 202A, 241, 270 and 307 of the drawings in U.S. Pat. No. 4,455,602, and to that part of the descriptive portion of the specification, particularly at columns 21-22, 48-49, 202-208, 307, and 344-347 thereof, which relate to the subject matter of the claims herein.

What is claimed is:

1. In a digital computer system including processor means for performing operations upon operands, memory means for storing instructions for directing said operations, bus means for conducting instructions between said memory means and said processor means, and I/O means for conducting operands between said processor means and devices external to said digital computer sytem, said processor means comprising:

ALU means connected to said bus means for performing said operations, means connected to said bus means for receiving said instructions, each of said instructions being a member of a group of related instructions from a plurality of groups of related instructions, microcode control means including means for storing sequences of microinstructions for controlling said operations performed by said ALU means, said sequences of microinstructions including a plurality of sets of sequences of microinstructions, each set thereof corresponding to a group of related instructions from said plurality of groups of related instructions, and each said set of sequences of microinstructions including at least one sequence of microinstructions which corresponds to one of the instructions of its corresponding group of related instructions, said instruction receiving means including group code register means for storing a plurality of group codes, each said group code corresponding to one of said group of related instructions and a current group code representing a group of related instructions of which a current instruction directing said operations is a member, said microcode control means further including means responsive to each current instruction and to each corresponding current group code for providing at least one sequence of microinstructions to said ALU means.

2. The digital computer system of claim 1, wherein said means for storing said sequences of microinstructions is a control store means, and said microinstruction sequence providing means includes dispatch table means for storing addresses corresponding to the locations of the sequences of microinstructions of each set of microinstruction sequences, said dispatch table means being responsive to a current group code and to a current instruction for providing to said control store means an address corresponding to at least one microinstruction sequence corresponding to said current instruction, and said control store means being responsive to said address to provide to said ALU means said at least one microinstruction sequence corresponding to said current instruction.

3. The digital computer sytem of claims 1 or 2, wherein said instruction receiving means further comprises:

instruction register means connected to said bus means for storing at least one of said instructions, and parsing means connected to said instruction register means for detecting an instruction stored in said instruction register means and for providing said instruction to said microcode control means.

4. The digital computer system of claim 3, wherein said receiving means further comprises:

prefetch means connected to said bus means and responsive to the operation of said parsing means for providing read request outputs to said memory means, said memory means responsive to said read request outputs for providing instructions to said receiving means.

5. The digital computer system of claims 1 or 2, wherein said control store means comprises:

writable control store means connected to said bus means for storing said sequences of microinstructions, and control store addressing means responsive to instructions and to the operation of said processor means for providing corresponding control store read and write addresses, said writable control store means being responsive to said read addresses for providing at least one sequence of microinstructions to said ALU means, and further responsive to said write addresses for storing sequences of microinstructions.

6. The digital computer system of claim 2, wherein said control store means further comprises:
  writable control store means connected to said bus means for storing sequences of microinstructions, and
  said dispatch table means further comprises write address means responsive to the operation of said processor means for generating write addresses,
  said writable control store means being responsive to said write addresses for storing said sequences of microinstructions.

* * * * *